(12) United States Patent
Halalay et al.

(10) Patent No.: US 9,130,231 B2
(45) Date of Patent: *Sep. 8, 2015

(54) LITHIUM ION BATTERY

(71) Applicant: GM Global Technology Operations, LLC, Detroit, MI (US)

(72) Inventors: Ion C. Halalay, Grosse Pointe Park, MI (US); Stephen J. Harris, Bloomfield, MI (US); Timothy J. Fuller, Pittsford, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/336,669

(22) Filed: Jul. 21, 2014

(65) Prior Publication Data

US 2014/0329143 A1 Nov. 6, 2014

Related U.S. Application Data

(63) Continuation of application No. 12/642,313, filed on Dec. 18, 2009, now Pat. No. 8,785,054.

(51) Int. Cl.
*H01M 4/62* (2006.01)
*H01M 2/16* (2006.01)
*H01M 10/0525* (2010.01)

(52) U.S. Cl.
CPC .............. *H01M 4/628* (2013.01); *H01M 2/162* (2013.01); *H01M 2/1653* (2013.01); *H01M 4/622* (2013.01); *H01M 10/0525* (2013.01); *H01M 2220/30* (2013.01); *H01M 2300/0025* (2013.01);

(Continued)

(58) Field of Classification Search
CPC .............. H01M 4/628; H01M 2/1653; H01M 10/0525; H01M 4/622; H01M 2/162
See application file for complete search history.

(56) References Cited

U.S. PATENT DOCUMENTS

| 5,130,211 A | 7/1992 | Wilkinson et al. |
| 6,689,513 B1 | 2/2004 | Morigaki et al. |
| 2010/0068622 A1 | 3/2010 | Wang et al. |

FOREIGN PATENT DOCUMENTS

| CN | 101322277 | 12/2008 |
| JP | 2006026588 | 2/2006 |
| WO | WO2007064170 | 6/2007 |

OTHER PUBLICATIONS

Walkowiak, et al., Macrocycle Carriers for Separation of Metal Ions in Liquid Membrane Process—A review, Desalination240, 1999, pp. 186-197.

(Continued)

*Primary Examiner* — Helen O Conley
(74) *Attorney, Agent, or Firm* — Dierker & Associates, P.C.

(57) ABSTRACT

In a lithium ion battery, one or more chelating agents may be attached to a microporous polymer separator for placement between a negative electrode and a positive electrode or to a polymer binder material used to construct the negative electrode, the positive electrode, or both. The chelating agents may comprise, for example, at least one of a crown ether, a crown ether, a podand, a lariat ether, a calixarene, a calixcrown, or mixtures thereof. The chelating agents can help improve the useful life of the lithium ion battery by complexing with unwanted metal cations that may become present in the battery's electrolyte solution while, at the same time, not significantly interfering with the movement of lithium ions between the negative and positive electrodes.

14 Claims, 1 Drawing Sheet

(52) U.S. Cl.
CPC .......... *Y02E 60/122* (2013.01); *Y10T 29/49108* (2015.01)

(56) References Cited

OTHER PUBLICATIONS

Komaba et al., Inorganic Electrolyte Additives to Suppress the Degradation of Graphite Anodes by Dissolved Mn(II) for Lithium-Ion Batteries, Journal of Power Sources 119-121, 2003, pp. 378-382.

Shahrisa, et al., Chemistry of Pyrones, Part 3: New Podands of 4H-Pyran-4-ones; 5 Molecules, 2000, pp. 200-207.

Bruening, et al., Understanding Cation-Macrocycle Binding Selectivity in Single-Solvent Extractions, and Liquid Membrane Systems by Quantifying Thermodynamic Interactions; Cation Binding by Macrocycles, Chapter 2, 1990, pp. 112-113, Marcel Dekker Inc., New York and Basel.

Kaifer, et al., Redox Control of Cation Binding in Macrocyclic Systems; Cation Binding by Macrocycles, 1990, Chapter 8, p. 364, Marcel Dekker Inc., New York and Basel.

Atwood et al., Cation Complexation by Calixarenes; Cation Binding by Macrocycles, 1990, Chapter 15, pp. 581-582, 587; Marcel Dekker Inc., New York and Basel.

Tonor et al., Modern Aspects of Host-Guest Chemistry: Molecular Modeling and Conformationally Restricted Hosts; Crown Ethers and Analogs, 1989, Chapter 3, pp. 81-83, John Wiley and Sons, New York.

Vogtle, et al., Crown-ether-complexes and Selectivity; Crown Ethers and Analogs, 1989, Chapter 4, pp. 208-215, John Wiley and Sons, New York.

Arora et al., Battery Separators, Chem. Rev. 104, 2004, pp. 4419-4462.

Weber, E., New Developments in Crown Ether Chemistry: Lariats, Spherands, and Second-Sphere Complexes; Crown Ethers and Analogs, 1989, Chapter 5, pp. 306-307, 309, 314-315, 320-321, John Wiley and Sons, New York.

Chinese Office Action dated May 27, 2013; Applicant: GM Global Technology Operations LLC.; Application No. 201010625043.0; 7 pages.

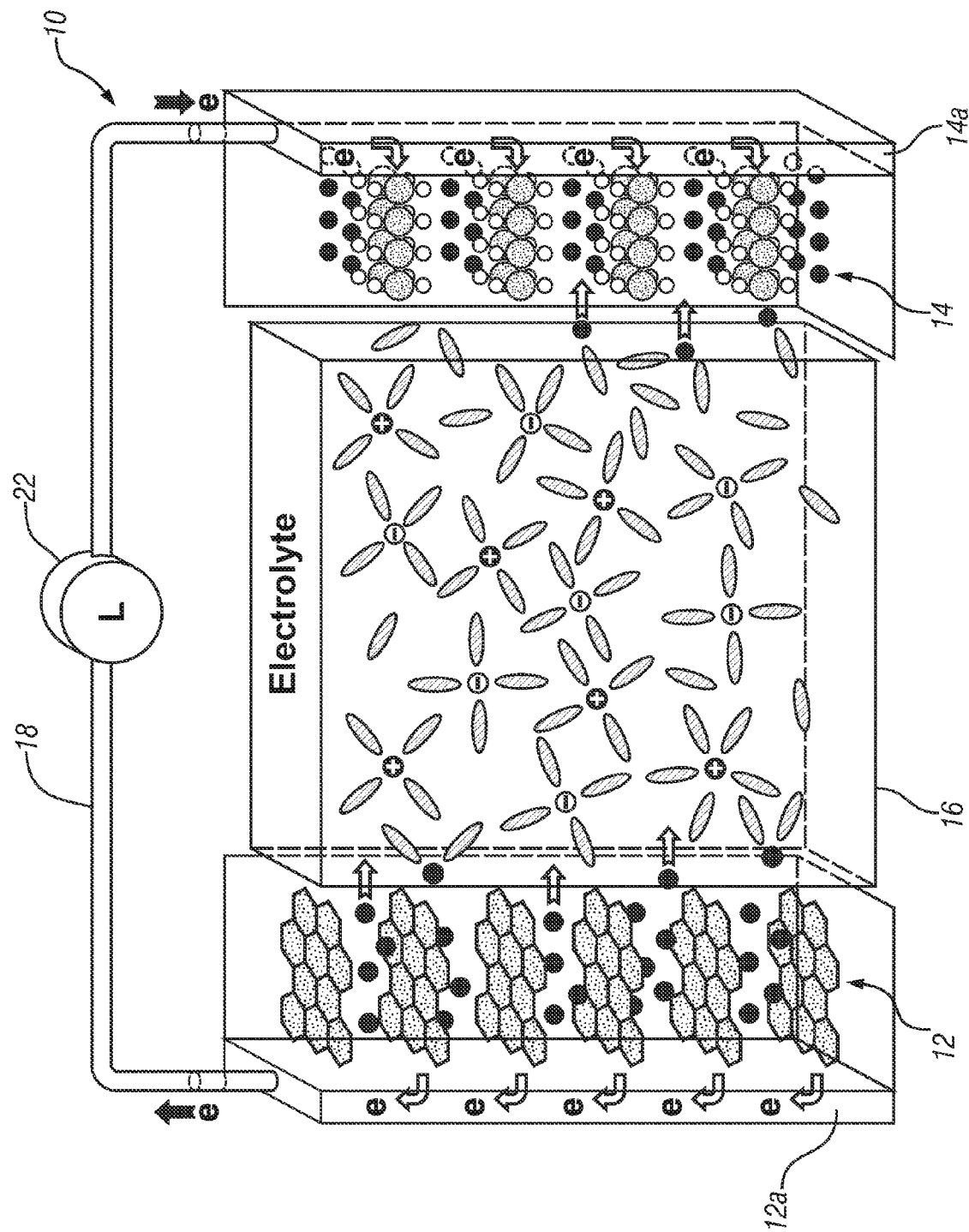

LITHIUM ION BATTERY

CROSS-REFERENCE TO RELATED APPLICATIONS

This application is a continuation of U.S. patent application Ser. No. 12/642,313, filed Dec. 18, 2009, which is incorporated by reference herein in its entirety.

TECHNICAL FIELD

The technical field relates generally to secondary lithium ion batteries and methods of making and using the same.

BACKGROUND

Secondary, or rechargeable, lithium ion batteries are well known and often used in many stationary and portable devices such as those encountered in the consumer electronic, automobile, and aerospace industries. The lithium ion class of batteries have gained popularity for various reasons including, but not limited to, a relatively high energy density, a general nonappearance of any memory effect when compared to other kinds of rechargeable batteries, a relatively low internal resistance, and a low self-discharge rate when not in use.

A lithium ion battery generally operates by reversibly passing lithium ions between a negative electrode (sometimes called the anode) and a positive electrode (sometimes called the cathode). The negative and positive electrodes are situated on opposite sides of a microporous polymer separator that is soaked with an electrolyte solution suitable for conducting lithium ions. Each of the negative and positive electrodes is also accommodated by a current collector. The current collectors associated with the two electrodes are connected by an interruptible external circuit that allows an electric current to pass between the electrodes to electrically balance the related migration of lithium ions. The materials used to produce these various components of a lithium ion battery are quite extensive. But in general, the negative electrode typically includes a lithium intercalation host material, the positive electrode typically includes a lithium-based active material that can store lithium metal at a lower energy state than the intercalation host material of the negative electrode, and the electrolyte solution typically contains a lithium salt dissolved in a non-aqueous solvent.

A lithium ion battery, or a plurality of lithium ion batteries that are connected in series or in parallel, can be utilized to reversibly supply power to an associated load device. A brief discussion of a single power cycle beginning with battery discharge can be insightful on this point.

To begin, during discharge, the negative electrode of a lithium ion battery contains a high concentration of intercalated lithium while the positive electrode is relatively depleted. The establishment of a closed external circuit between the negative and positive electrodes under such circumstances causes the extraction of intercalated lithium from the negative anode. The extracted lithium is then split into lithium ions and electrons. The lithium ions are carried through the micropores of the interjacent polymer separator from the negative electrode to the positive electrode by the ionically conductive electrolyte solution while, at the same time, the electrons are transmitted through the external circuit from the negative electrode to the positive electrode (with the help of the current collectors) to balance the overall electrochemical cell. This flow of electrons through the external circuit can be harnessed and fed to a load device until the level of intercalated lithium in the negative electrode falls below a workable level or the need for power ceases.

The lithium ion battery may be recharged after a partial or full discharge of its available capacity. To charge or re-power the lithium ion battery, an external power source is connected to the positive and the negative electrodes to drive the reverse of battery discharge electrochemical reactions. That is, during charging, the external power source extracts the intercalated lithium present in the positive electrode to produce lithium ions and electrons. The lithium ions are carried back through the separator by the electrolyte solution and the electrons are driven back through the external circuit, both towards the negative electrode. The lithium ions and electrons are ultimately reunited at the negative electrode thus replenishing it with intercalated lithium for future battery discharge.

The ability of lithium ion batteries to undergo such repeated power cycling over their useful lifetimes makes them an attractive and dependable power source. But lithium ion battery technology is constantly in need of innovative developments and contributions that can help advance to this and other related fields of technological art.

SUMMARY

One exemplary embodiment of the invention is a microporous polymer separator, for use in a lithium ion battery, to which one or more chelating agents may be attached. The one or more chelating agents can complex with metal cations but do not strongly complex with lithium ions so that the movement of lithium ions across the microporous polymer separator during operation of the lithium ion battery is not substantially affected.

Another exemplary embodiment of the invention is a lithium ion battery that may comprise a negative electrode, a positive electrode, and a microporous polymer separator situated between the negative electrode and the positive electrode. The negative electrode may comprise a lithium host material and a polymer binder material. The positive electrode may comprise a lithium-based active material and a polymer binder material. One or more chelating agents may be attached to at least one of the microporous polymer separator, the binder material of the negative electrode, or the binder material of the positive electrode. The one or more chelating agents can complex with metal cations but do not strongly complex with lithium ions so that the movement of lithium ions between the negative and positive electrodes is not substantially affected.

Yet another exemplary embodiment of the invention is a lithium ion battery that may comprise a negative electrode, a positive electrode, an interruptible external circuit that connects the negative electrode and the positive electrode, a microporous polymer separator to which one or more chelating agents are attached situated between the negative electrode and the positive electrode, and an electrolyte solution capable of conducting lithium ions soaked into the negative electrode, the positive electrode, and the microporous polymer separator. The microporous polymer separator may comprise at least one of polyethylene or polypropylene and have pendent groups or insoluble polymer bound groups that comprise the chelating agents. The chelating agents can complex with metal cations that leach from the positive electrode. The chelating agents, moreover, may comprise at least one of a crown ether, a podand, a lariat ether, a calixarene, a calixcrown, or a mixture of two or more of these chelating agents.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the invention will become more fully understood from the detailed description and the accompanying drawings, wherein:

The FIGURE provided is a schematic and illustrative view of a lithium ion battery, during discharge, according to various embodiments of the invention. The separator is shown here to help illustrate the flow of ions between the negative and positive electrodes and, as such, is not necessarily drawn to scale.

DETAILED DESCRIPTION

The following description of the embodiment(s) is merely exemplary in nature and is not intended to limit the invention, its application, or uses.

A lithium ion battery can suffer cumulative capacity reductions and other detrimental effects, such as the reduction of solvent molecules, when destructive metal cations are introduced into its various components. To help address such an issue, an appropriate amount of one or more chelating agents may be attached to the microporous polymer separator situated between the negative and positive electrodes and/or to the polymer binder material used to construct the negative electrode, the positive electrode, or both. The chelating agents can be chosen to selectively complex with unwanted metal cations that may become present in the electrolyte solution over the life of the battery. For example, in one embodiment, the immobilization of certain metal cations that may dissolve into the electrolyte solution from the positive electrode (i.e., cations of manganese, cobalt, and/or iron) can help protect the lithium ion battery against negative electrode poisoning and a resultant reduction to its capacity and useful life. The chelating agents thus operate as metal cation scavenger molecules that trap and immobilize unwanted metal cations so as to prevent the migration of those metal cations through the electrolyte solution. But at the same time the chelating agents do not strongly complex with lithium ions and, as such, will not adversely affect the movement of lithium ions between the negative and positive electrodes to the point where an uncharacteristic reduction of the expected electrical current to be supplied by the battery occurs during discharge.

An exemplary and schematic illustration of a secondary lithium ion battery 10 is shown that includes a negative electrode 12, a positive electrode 14, a microporous polymer separator 16 sandwiched between the two electrodes 12, 14, and an interruptible external circuit 18 that connects the negative electrode 12 and the positive electrode 14. Each of the negative electrode 12, the positive electrode 14, and the microporous polymer separator 16 may be soaked in an electrolyte solution capable of conducting lithium ions. The microporous polymer separator 16, which operates as both an electrical insulator and a mechanical support, is sandwiched between the negative electrode 12 and the positive electrode 14 to prevent physical contact between the two electrodes 12, 14 and the occurrence of a short circuit. The microporous polymer separator 16, in addition to providing a physical barrier between the two electrodes 12, 14, may also provide a minimal resistance to the internal passage of lithium ions (and related anions) to help ensure the lithium ion battery 10 functions properly. A negative-side current collector 12a and a positive-side current collector 14a may be positioned at or near the negative electrode 12 and the positive electrode 14, respectively, to collect and move free electrons to and from the external circuit 18.

The lithium ion battery 10 may support a load device 22 that can be operatively connected to the external circuit 18. The load device 22 may be powered fully or partially by the electric current passing through the external circuit 18 when the lithium ion battery 10 is discharging. While the load device 22 may be any number of known electrically-powered devices, a few specific examples of a power-consuming load device include an electric motor for a hybrid vehicle or an all-electrical vehicle, a laptop computer, a cellular phone, and a cordless power tool, to name but a few. The load device 22 may also, however, be a power-generating apparatus that charges the lithium ion battery 10 for purposes of storing energy. For instance, the tendency of windmills and solar panel displays to variably and/or intermittently generate electricity often results in a need to store surplus energy for later use.

The lithium ion battery 10 can include a wide range of other components that, while not depicted here, are nonetheless known to skilled artisans. For instance, the lithium ion battery 10 may include a casing, gaskets, terminal caps, and any other desirable components or materials that may be situated between or around the negative electrode 12, the positive electrode 12, and/or the microporous polymer separator 16 for performance-related or other practical purposes. Moreover, the size and shape of the lithium ion battery 10 may vary depending on the particular application for which it is designed. Battery-powered automobiles and hand-held consumer electronic devices, for example, are two instances where the lithium ion battery 10 would most likely be designed to different size, capacity, and power-output specifications. The lithium ion battery 10 may also be connected in series or parallel with other similar lithium ion batteries to produce a greater voltage output and power density if the load device 22 so requires.

The lithium ion battery 10 can generate a useful electric current during battery discharge by way of reversible electrochemical reactions that occur when the external circuit 18 is closed to connect the negative electrode 12 and the positive electrode 14 at a time when the negative electrode 12 contains a sufficiently higher relative quantity of intercalated lithium. The chemical potential difference between the positive electrode 14 and the negative electrode 12—approximately 3.7 to 4.2 volts depending on the exact chemical make-up of the electrodes 12, 14—drives electrons produced by the oxidation of intercalated lithium at the negative electrode 12 through the external circuit 18 towards the positive electrode 14. Lithium ions, which are also produced at the negative electrode, are concurrently carried by the electrolyte solution through the microporous polymer separator 16 and towards the positive electrode 14. The electrons flowing through the external circuit 18 and the lithium ions migrating across the microporous polymer separator 16 in the electrolyte solution eventually reconcile and form intercalated lithium at the positive electrode 14. The electric current passing through the external circuit 18 can be harnessed and directed through the load device 22 until the intercalated lithium in the negative electrode 12 is depleted and the capacity of the lithium ion battery 10 is diminished.

The lithium ion battery 10 can be charged or re-powered at any time by applying an external power source to the lithium ion battery 10 to reverse the electrochemical reactions that occur during battery discharge. The connection of an external power source to the lithium ion battery 10 compels the otherwise non-spontaneous oxidation of intercalated lithium at the positive electrode 14 to produce electrons and lithium ions. The electrons, which flow back towards the negative electrode 12 through the external circuit 18, and the lithium ions, which are carried by the electrolyte across the microporous polymer separator 16 back towards the negative electrode 12, reunite at the negative electrode 12 and replenish it with intercalated lithium for consumption during the next battery discharge cycle. The external power source that may be used to charge the lithium ion battery 10 may vary depending on the size, construction, and particular end-use of the lithium ion battery 10. Some notable and exemplary external power sources include, but are not limited to, an AC wall outlet and a motor vehicle alternator.

The negative electrode 12 may include any lithium host material that can sufficiently undergo lithium intercalation and deintercalation while functioning as the negative terminal of the lithium ion battery 10. The negative electrode 12 may also include a polymer binder material to structurally hold the lithium host material together. For example, in one embodiment, the negative electrode 12 may be formed from graphite intermingled in at least one of polyvinylidene fluoride (PVdF), an ethylene propylene diene monomer (EPDM) rubber, or carboxymethyl cellulose (CMC). Graphite is widely utilized to form the negative electrode because it exhibits favorable lithium intercalation and deintercalation characteristics, is relatively non-reactive, and can store lithium in quantities that produce a relatively high energy density. Commercial forms of graphite that may be used to fabricate the negative electrode 12 are available from, for example, Timcal Graphite & Carbon, headquartered in Bodio, Switzerland, Lonza Group, headquartered in Basel, Switzerland, or Superior Graphite, headquartered in Chicago, USA. Other materials can also be used to form the negative electrode including, for example, lithium titanate. The negative-side current collector 12a may be formed from copper or any other appropriate electrically conductive material known to skilled artisans.

The positive electrode 14 may be formed from any lithium-based active material that can sufficiently undergo lithium intercalation and deintercalation while functioning as the positive terminal of the lithium ion battery 10. The positive electrode 14 may also include a polymer binder material to structurally hold the lithium-based active material together. One common class of known materials that can be used to form the positive electrode 14 is layered lithium transitional metal oxides. For example, in various embodiments, the positive electrode 14 may comprise at least one of spinel lithium manganese oxide ($LiMn_2O_4$), lithium cobalt oxide ($LiCoO_2$), a nickel-manganese-cobalt oxide [$Li(Ni_xMn_yCo_z)O_2$], or a lithium iron polyanion oxide such as lithium iron phosphate ($LiFePO_4$) or lithium iron fluorophosphate ($Li_2FePO_4F$) intermingled in at least one of polyvinylidene fluoride (PVdF), an ethylene propylene diene monomer (EPDM) rubber, or carboxymethyl cellulose (CMC). Other lithium-based active materials may also be utilized besides those just mentioned. Those alternative materials include, but are not limited to, lithium nickel oxide ($LiNiO_2$), lithium aluminum manganese oxide ($Li_xAl_yMn_{1-y}O_2$), and lithium vanadium oxide ($LiV_2O_5$), to name but a few. The positive-side current collector 14a may be formed from aluminum or any other appropriate electrically conductive material known to skilled artisans.

Any appropriate electrolyte solution that can conduct lithium ions between the negative electrode 12 and the positive electrode 14 may be used in the lithium ion battery 10. In one embodiment, the electrolyte solution may be a non-aqueous liquid electrolyte solution that includes a lithium salt dissolved in an organic solvent or a mixture of organic solvents. Skilled artisans are aware of the many non-aqueous liquid electrolyte solutions that may be employed in the lithium ion battery 10 as well as how to manufacture or commercially acquire them. A non-limiting list of lithium salts that may be dissolved in an organic solvent to form the non-aqueous liquid electrolyte solution include $LiClO_4$, $LiAlCl_4$, $LiI$, $LiBr$, $LiSCN$, $LiBF_4$, $LiB(C_6H_5)_4 LiAsF_6$, $LiCF_3SO_3$, $LiN(CF_3SO_2)_2$, $LiPF_6$, and mixtures thereof. These and other similar lithium salts may be dissolved in a variety of organic solvents such as, but not limited to, cyclic carbonates (ethylene carbonate, propylene carbonate, butylene carbonate), acyclic carbonates (dimethyl carbonate, diethyl carbonate, ethylmethylcarbonate), aliphatic carboxylic esters (methyl formate, methyl acetate, methyl propionate), γ-lactones (γ-butyrolactone, γ-valerolactone), chain structure ethers (1,2-dimethoxyethane, 1-2-diethoxyethane, ethoxymethoxyethane), cyclic ethers (tetrahydrofuran, 2-methyltetrahydrofuran), and mixtures thereof.

The microporous polymer separator 16 may comprise, in one embodiment, a polyolefin. The polyolefin may be a homopolymer (derived from a single monomer constituent) or a heteropolymer (derived from more than one monomer constituent), either linear or branched. If a heteropolymer derived from two monomer constituents is employed, the polyolefin may assume any copolymer chain arrangement including those of a block copolymer or a random copolymer. The same holds true if the polyolefin is a heteropolymer derived from more than two monomer constituents. In one embodiment, the polyolefin may be polyethylene (PE), polypropylene (PP), or a blend of PE and PP.

The microporous polymer separator 16 may be a single layer or a multi-layer laminate fabricated from either a dry or wet process. For example, in one embodiment, a single layer of the polyolefin may constitute the entirety of the microporous polymer separator 16. As another example, however, multiple discrete layers of similar or dissimilar polyolefins may be assembled into the microporous polymer separator 16. The microporous polymer separator 16 may also comprise other polymers in addition to the polyolefin such as, but not limited to, polyethylene terephthalate (PET), polyvinylidene fluoride (PVdF), and or a polyamide (Nylon). The polyolefin layer, and any other optional polymer layers, may further be included in the microporous polymer separator 16 as a fibrous layer to help provide the microporous polymer separator 16 with appropriate structural and porosity characteristics. Skilled artisans will undoubtedly know and understand the many available polymers and commercial products from which the microporous polymer separator 16 may be fabricated, as well as the many manufacturing methods that may be employed to produce the microporous polymer separator 16. A more complete discussion of single and multi-layer lithium ion battery separators, and the dry and wet processes that may be used to make them, can be found in P. Arora and Z. Zhang, "Battery Separators," *Chem. Rev.*, 104, 4424-4427 (2004).

The chelating agents, which may be attached to the microporous polymer separator 16 and/or the polymer binders in at least one of the negative electrode 12 or the positive electrodes 14, may be any of a variety of molecules that can complex with unwanted metal cations to form stable and neutral compounds while, at the same time, not adversely affecting the flow of lithium ions between the negative and positive electrodes 12, 14. The particular chelating agent or agents may, in some instances, be chosen to selectively complex with certain metal cations that are known or expected to be present in the electrolyte solution at some point during operational lifetime of the lithium ion battery 10. For example, spinel lithium manganese oxide ($LiMn_2O_4$) that may be present in the positive electrode 14 may leach $Mn^{2+}$ cations into the electrolyte solution during normal operation of the lithium ion battery 10. These mobile $Mn^{2+}$ cations, in turn, can migrate through the electrolyte solution and across the microporous polymer separator 16 until they eventually reach the negative electrode 12. Moreover, if the negative electrode 12 is formed from graphite, the $Mn^{2+}$ cations that reach the negative electrode 12 tend to undergo a reduction reaction and deposit on the graphite surface since the standard redox potential of Mn/Mn(II) is much higher than that of lithium intercalation into graphite. The deposition of manganese onto graphite in the negative electrode 12 catalyzes the reduction of solvent molecules at the contaminated interface of the negative electrode 12 and the electrolyte solution causing the evolution of gases. The poisoned portion of the negative electrode 12 is essentially deactivated and no longer able to facilitate the reversible gain and loss of intercalated lithium. Similarly, the dissolution of cobalt cations ($Co^{2+}$) and iron cations ($Fe^{2+}$) from lithium cobalt oxide ($LiCoO_2$) and lithium iron phosphate ($LiFePO_4$), respectively, that may be present in the positive electrode 14 can also cause capacity losses in the lithium ion battery 10 by the same or related mechanism. The leaching of $Co^{2+}$ cations may occur, in one instance, because of an ancillary chemical reaction with various adhesives normally used in the packaging of the lithium ion battery 10. The leaching of $Fe^{2+}$ cations may occur, in one instance, because of the presence of hydrofluoric acid that may be produced through the ingress and egress of water into the electrolyte solution.

But regardless of the lithium-based active material(s) used in the positive electrode 14, the leaching rate of metal cations into the electrolyte solution may vary. The leaching rate of metal cations from positive electrode 14 may be relatively slow and require several years for the electrolyte solution to accumulate a concentration of associated metal cations measurable in parts per million (ppm). The leaching rate of metal cations from the positive electrode 14 may also, on the other hand, be relatively fast in that the concentration of associated metal cations in the electrolyte solution increases by about 0.1 weight percent per battery power cycle. The leaching of any amount of metal cations from the positive electrode 14, whether slow or fast, can nevertheless poison large areas of the graphite in the negative electrode 12 and ultimately cause a noticeable and performance-affecting reduction in capacity of the lithium ion battery 10. An amount of chelating agents effective to sequester the cumulative dissolution of metal cations into the electrolyte solution during the operational lifetime of the lithium ion battery 10 may therefore be attached to the microporous polymer separator 16 and/or the polymer binding materials in at least one of the negative or positive electrodes 12, 14. The exact amount of chelating agents employed, which may vary considerably, is generally predicated on the chemistry of the lithium ion battery 10, the compositional make-up of the negative and positive electrodes 12, 14, and the expected or observed rate at which unwanted metal cations are introduced into the electrolyte solution during operation of the lithium ion battery.

The chelating agents may comprise, for example, at least one of a crown ether, a podand, a lariat ether, a calixarene, a calixcrown, or mixtures thereof. These chelating agents are useful because they will not strongly complex with the relatively small lithium ions moving between the negative and positive electrodes 12, 14 because of their size and spatial constructions. Skilled artisans will generally know and understand, or be able identify, the many molecular compounds that may constitute these classes of chelating agents. A generalized description of these chelating agents is nonetheless provided here for convenience.

A crown ether is a macrocyclic polyether in which the polyether ring includes oxygen donor atoms that can complex with a metal cation. Some or all of the oxygen donor atoms in the polyether ring may be exchanged for nitrogen atoms, a class of crown ethers known as azacrowns, or sulfur atoms, a class of crown ethers known as thiacrowns. The crown ether may be monocyclic, in which the crown ether forms a somewhat two-dimensional ring for complexing with a metal cation, or polycyclic, in which the crown ether forms a more three-dimensional cage for complexing with a metal cation. One example of a polycyclic crown ether is a cryptand. The crown ether may also be substituted at any location along its polyether ring by any of a variety of groups known to those skilled in the art. A podand is an acyclic polyether ligand that includes donor-group-bearing arms that can complex with a metal cation. A lariat ether is a crown ether that includes a donor-group-bearing side-arm that provides additional metal cation binding sites beyond those present on the polyether ring. A calixarene is a metacyclophane of methylene-bridged phenol units, and is generally found in one of a cone, partial cone, 1,2-alternate, or 1,3-alternate conformation. A calixcrown is a calixarene that includes a polyether ring that links two phenolic oxygens of the calixarene framework. The indifference these chelating agents show towards complexing with lithium ions is likely ascribed to their relatively large polyether ring or cage structures and/or the spatial orientation of their functional donor-group-bearing arms when compared to the relatively small size of lithium ions. Analogs and structurally related molecules of the chelating agents just mentioned may also be employed.

A nonexhaustive and exemplary list of crown ethers that can complex with metal cations which may, for example, leach into the electrolyte solution from the positive electrode 14 (such as cations of manganese, cobalt, and iron) includes (1) 15-crown-5, (2) dibenzo-15-crown-5, (3) 18-crown-6, (4) benzo-18-crown-6, (5) dibenzo-18-crown-6, (6) dibenzo-21-crown-7, (7) dicyclohexano-18-crown-6, (8) dicyclohexano-24-crown-8, (9) poly(dibenzo-18-crown-6), (10) 1,4,7,10,13,16-hexathia-18-crown-6, (11) 1,4,7,10,13,16-hexaaza-18-crown-6, (12) 1-aza-18-crown-6, (13) 1,10-diaza-18-crown-6, (14) N,N'-dibenzyl-4,13-diaza-18-crown-6, and (15) 4,7,13,16,21,24-hexaoxa-1,10-diazabycyclo[9.8.8]hexacosane, the structures of which are shown below. The hydrogen atoms in structures 11-13 are assumed.

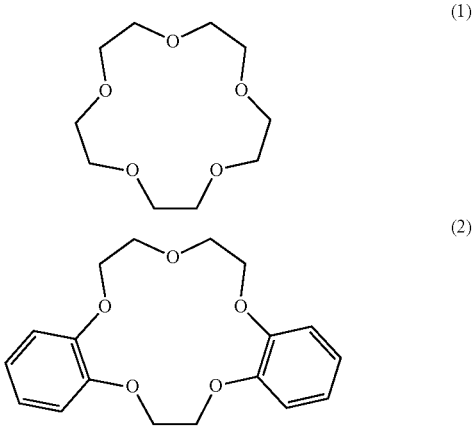

(3)
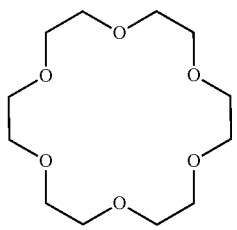
(4)
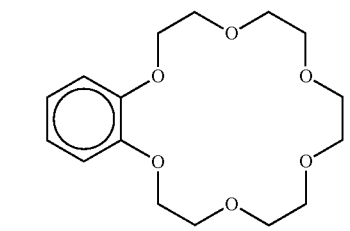
(5)
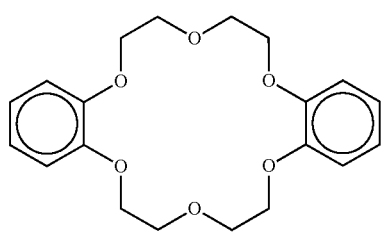
(6)
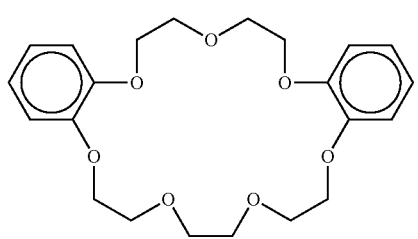
(7)
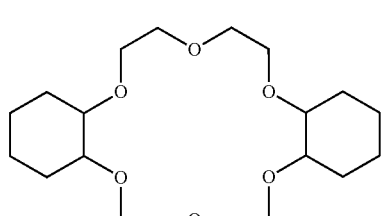
(8)
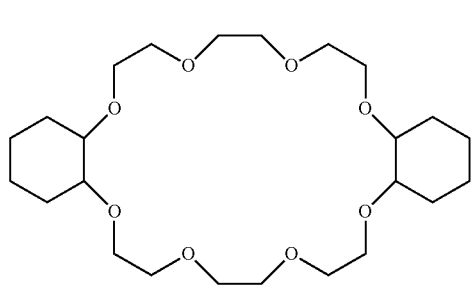
(9)
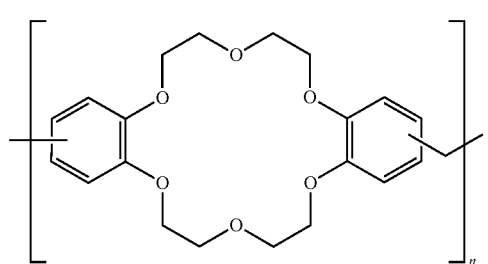
(10)
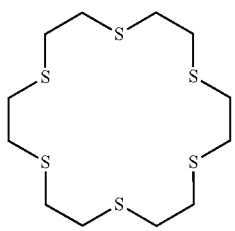
(11)
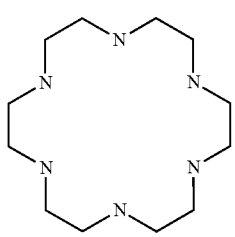
(12)
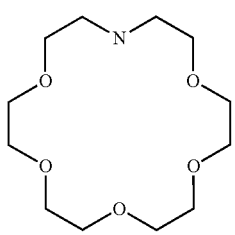
(13)
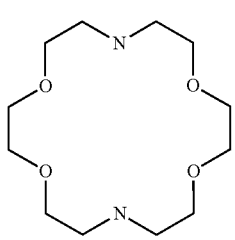
(14)
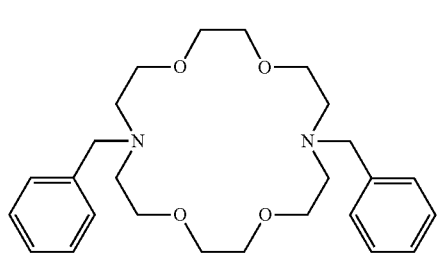

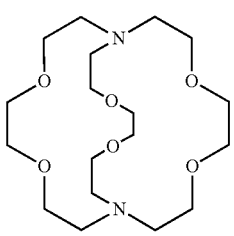

Some more examples of crown ethers, including thiacrowns and azacrowns, that may be attached to the microporous polymer separator 16 can be found in W. Walkowiak and C. A. Kozlowski, "Macrocycle Carriers for Separation of Metal Ions in Liquid Membrane Processes—A Review," *Desalination* 240, Table 1 on pg. 189 (compounds 1-15 that are not already mentioned above) (2009); R. L Bruening, R. M. Izatt, and J. S. Bradshaw, "Understanding Cation-Macrocycle Binding Selectivity in Single-Solvent Extractions, and Liquid Membrane Systems by Quantifying Thermodynamic Interactions, FIG. 1 on pg. 112 in "Cation Binding by Macrocycles,"Y. Inoue and G. W. Gokel (editors), Chapter 2, 1990, Marcel Dekker Inc., New York and Basel; J. L. Tonor, "Modern Aspects of Host-Guest Chemistry: Molecular Modeling and Conformationally Restricted Hosts," FIG. 2 on pg. 82 in "Crown Ethers and Analogs," S. Patai and Z. Rappaport (editors), Chapter 3, 1989, John Wiley and Sons, New York; F. Vögtle and E. Weber, "Crown-ether-complexes and Selectivity," FIGS. 1, 2, and 3 on pg. 209, 210, and 211, respectively, in "Crown Ethers and Analogs," S. Patai and Z. Rappaport (editors), Chapter 4, 1989, John Wiley and Sons, New York, the above-identified portions of each reference being hereby incorporated by reference.

A nonexhaustive and exemplary list of podands that can complex with metal cations which may, for example, leach into the electrolyte solution from the positive electrode 14 can be found in W. Walkowiak and C. A. Kozlowski, "Macrocycle Carriers for Separation of Metal Ions in Liquid Membrane Processes—A Review," *Desalination* 240, Table 2 on pg. 190 (compounds 32a and 32b) (2009); A. Shahrisa and A. Banaei, "Chemistry of Pyrones, Part 3: New Podands of 4H-Pyran-4-ones, 5 *Molecules*," FIGS. 1 and 3 on pg. 201 (2000); and F. Vögtle and E. Weber, "Crown-ether-complexes and Selectivity," FIGS. 4, 5, 6, and 7 on pg. 212, 213, 214, and 215, respectively, in "Crown Ethers and Analogs," S. Patai and Z. Rappaport (editors), Chapter 4, 1989, John Wiley and Sons, New York; and *Crown Ethers and Analogs*, edited by Patai and Rappoport, (1989), the above-identified portions of each reference being hereby incorporated by reference.

A nonexhaustive and exemplary list of lariat ethers that can complex with metal cations which may, for example, leach into the electrolyte solution from the positive electrode 14 can be found in W. Walkowiak and C. A. Kozlowski, "Macrocycle Carriers for Separation of Metal Ions in Liquid Membrane Processes—A Review," *Desalination* 240, Table 1 on pg. 189 (compounds 16-18) (2009); and E. Weber, "New Developments in Crown Ether Chemistry: Lariats, Spherands, and Second-Sphere Complexes," FIGS. 2, 4, and 6 on pg. 307, 309, and 315, respectively, in "Crown Ethers and Analogs," S. Patai and Z. Rappaport (editors), Chapter 5, 1989, John Wiley and Sons, New York, the above-identified portions of each reference being hereby incorporated by reference.

A nonexhaustive and exemplary list of calixarenes that can complex with metal cations which may, for example, leach into the electrolyte solution from the positive electrode 14 can be found in W. Walkowiak and C. A. Kozlowski, "Macrocycle Carriers for Separation of Metal Ions in Liquid Membrane Processes—A Review," *Desalination* 240, Table 2 on pg. 190 (compounds 22-23) (2009); and J. L. Atwood, "Cation Complexation by Calixarenes," FIGS. 6 and 7 on pg. 587 (the ester functionalized calixarenes) in "Cation Binding by Macrocycles,"Y. Inoue and G. W. Gokel (editors), Chapter 15, 1990, Marcel Dekker Inc., New York and Basel, the above-identified portions of each reference being hereby incorporated by reference.

A nonexhaustive and exemplary list of calixcrowns that can complex with metal cations which may, for example, leach into the electrolyte solution from the positive electrode 14 can be found in W. Walkowiak and C. A. Kozlowski, "Macrocycle Carriers for Separation of Metal Ions in Liquid Membrane Processes—A Review," *Desalination* 240, Table 2 on pg. 190 (compounds 24-27, compound 28 with ester functionality, and compounds 30-31) (2009), the above-identified portions of each reference being hereby incorporated by reference.

There are, of course, many other crown ethers, podands, lariat ethers, calixarenes, calixcrowns, and related chelating agents that are known to skilled artisans, but are not specifically mentioned here, that can be attached to the microporous polymer separator 16 to sequester and immobilize unwanted metal cations that may be introduced into the electrolyte solution of the lithium ion battery 10.

The chelating agents may be attached to the microporous polymer separator 16 and the polymer binders of the negative and positive electrodes 12, 14 by any known method. For example, in one embodiment, a pendant group that comprises the chelating agent may be grafted onto the polyolefin used to make the microporous polymer separator 16. The chelating agents may be attached uniformly throughout polyolefin or they may be locally attached at predetermined locations. A greater concentration of the chelating agents may, for example, be provided on the side of the microporous polymer separator 16 that faces the positive electrode 14. Such a build-up of chelating agents on the positive-electrode-side of the microporous polymer separator 16 can help facilitate the earliest possible sequestering of any destructive metal cations that leach into the electrolyte solution from the positive electrode 14. Pendent groups that comprise the chelating agents may also be similarly grafted onto the other polymers in the microporous polymer separator 16, if present. In another embodiment, an insoluble polymer bound group that comprises the chelating agent may be entangled in, and optionally crosslinked to, the polymer matrix of the microporous polymer separator 16 and/or the polymer binder materials of at least one of the negative or positive electrodes 12, 14. The polymer bound group may be polyolefin, or some other polymer with similar properties, that includes a pendent group that comprises the chelating agent.

A poly(1-olefin) may be prepared, for instance, from the Ziegler-Natta polymerization of functionally substituted polyolefins or by metathesis polymerization. The resultant poly(1-olefins) may then be functionalized with the chelating agents. The same chelating agent substituted polyolefins may also be prepared by the polymerization of $\alpha,\omega$-olefins or pre-formed prepolymers that have been substituted with pendant chelating agent groups. Polyolefin heteropolymers, such as polyundecylenol, may be formed by either method and generally involve the controlled feed of similarly sized (i.e., number of carbons) olefin monomers or prepolymers during polymerization. The chelating agent substituted polyolefins, once prepared, may then be incorporated into the microporous polymer separator 16. In one embodiment, the chelating agent substituted polyolefins may be manufactured into a fairly rigid fibrous polyolefin layer that may constitute all or part of the microporous polymer separator 16. In another embodiment, however, the chelating agent substituted polyolefins may be insolubly bound within the polymer matrix of a separate fibrous polymer layer that is intended for use as all or part of the microporous polymer separator 16, or they may be insolubly bound within the polymer matrix of a polymer binder materials that is intended to be included in at least one of the negative or positive electrodes 12, 14.

The following examples are provided to help illustrate how a chelating agent substituted polyolefin may be prepared, and how such polyolefins may be incorporated into the microporous polymer separator 16 and/or the polymer binder materials of at least one of the negative or positive electrodes 12, 14. Example 1 demonstrates the preparation of a polyolefin that includes pendent crown ether groups in which a functionally substituted polyolefin was polymerized and then substituted with crown ether groups. Example 2 demonstrates the preparation of a polyolefin that includes pendent crown ether groups in which olefins were substituted with crown ether groups and then polymerized. Example 3 demonstrates the manufacture of a microporous polymer separator from the polyolefins of either Example 1 or Example 2. The microporous polymer separator manufactured in Example 3 includes a polyolefin layer having pendent crown ether groups. Example 4 demonstrates the manufacture of a microporous polymer separator or a negative electrode. In that Example, crown ether substituted polyolefins are insolubly bound within the polymer matrix of a commercially available polyolefin battery separator or a commercially available polymer binder material. Those materials may then be incorporated into a microporous polymer separator or a negative electrode, respectively.

EXAMPLE 1

In this example, a polyolefin with pendent 18-crown-6 groups (crown ether chelating agent) is prepared by the Zeigler-Natta polymerization of a halogenated polyolefin that is subsequently substituted with functionalized crown ether groups. The halogenated polyolefins may be formed by the direct polymerization of halo-functionalized monomers or the chemical modification of pre-formed prepolymers. To accomplish this, at least one α,ω-olefin such as 11-undecylenyl bromide (or iodide), 6-bromo-1-hexene, or 5-bromo-1-pentene may be polymerized with at least one 1-olefin such as ethane, propene, or 1-butene at a prefixed α,ω-olefin:1-olefin weight ratio of, for example, 1:9, 2:8, 3:7, or 5:5 in toluene. A catalyst, such as $TiCl_3.AA/Et_2AlCl$, may be used to make isotactic poly-α-olefins that form α-helix structures and polymerize the ω-substituted α-olefins. This polymerization reaction proceeds most efficiently when bulky monomer or prepolymer functionalized units that do not coordinate with the catalyst are used [e.g. $CH_2=CH-(CH_2)_y-X$]. Large halo groups (X) may also enhance the polymerization reaction (i.e., I>Br>Cl). The resultant polymers, which are soluble in hot toluene, can form carboxylic acid and alcohol functional groups by protection with, for example, trimethylsilyl-groups [$-Si(CH_3)_3$], which are readily removed on work-up with aqueous acids. Nucleophilic displacement of the halide ion with 2-hydroxymethyl-18-crown-6, hydroxymethyl-benzo-18-crown-6, or 2-aminobenzo-18-crown-6 in the presence of potassium carbonate and/or lutidine may then be achieved to attach pendent groups containing 18-crown-6 to the polyolefins. Moreover, at high concentrations of crown ether substituent groups, the polyolefins become less crystalline and may therefore be reinforced with 1,6-hexadience as a co-reactant to cross-link the polyolefins. The overall reaction in which pendent 18-crown-6 groups are grafted onto a polyolefin is shown below, where X may be I or Br, and Y may be 2-hydroxymethyl, hydroxymethyl-benzo, or 2-aminobenzo.

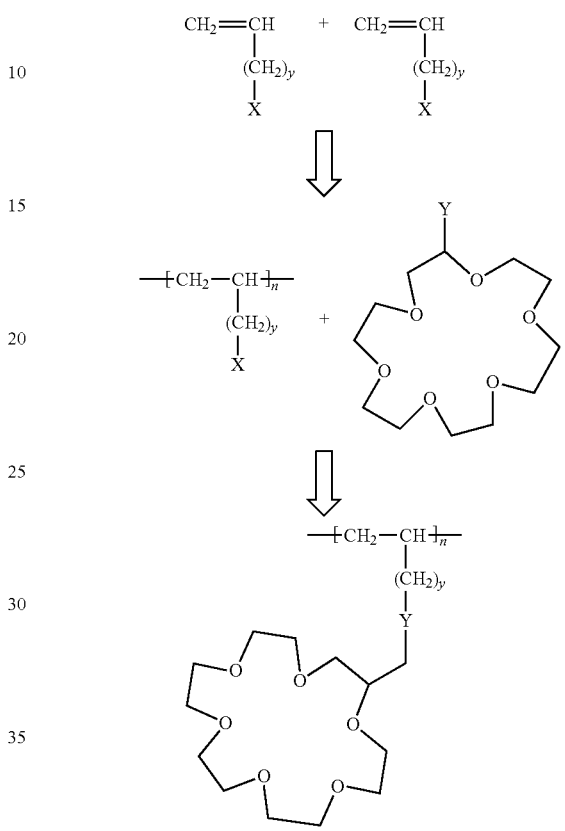

EXAMPLE 2

In this example, a polyolefin with pendent 18-crown-6 groups (crown ether chelating agent) is prepared by polymerizing α,ω-olefins or pre-formed prepolymers that have first been substituted with pendent crown ether groups. Crown ether substituted α,ω-olefins may be prepared by reacting at least one of 11-undecylenyl bromide (or iodide), 6-bromo-1-hexene, or 5-bromo-1-pentene with at least one of hydroxymethyl-18-crown-6 or hydroxymethyl-benzo-18-crown-6 in N,N-dimethylacetamide. Alcohol functional groups may be formed on the α,ω-olefins by protection with, for example, trimethylsilyl-groups [$-Si(CH_3)_3$], which are readily removed on work-up with aqueous acids. Nucleophilic displacement of the halide ion with 2-hydroxymethyl-18-crown-6 or hydroxymethyl-benzo-18-crown-6 in the presence of potassium carbonate and/or lutidine may then proceed until the bromo (or iodo) groups on the α,ω-olefins are replaced with 18-crown-6 groups. The crown ether substituted α,ω-olefins are then polymerized with at least one 1-olefin such as ethane, propene, or 1-butene at a pre-fixed α,ω-olefin:1-olefin weight ratio of, for example, 1:9, 2:8, 3:7, or 5:5 in toluene. A catalyst, such as $TiCl_3.AA/Et_2AlCl$, may be used to make isotactic poly-α-olefins that form α-helix structures and polymerize the ω-substituted α-olefins. Moreover, at high concentrations of crown ether substituent groups, the polyolefins become less crystalline and may therefore be reinforced with 1,6-hexadiene as a co-reactant to cross-link the polyolefin. The overall reaction in which pendent 18-crown-6 groups are grafted onto a polyolefin is shown below, where X may be I or Br, and Y may be 2-hydroxymethyl, hydroxymethyl-benzo, or 2-aminobenzo.

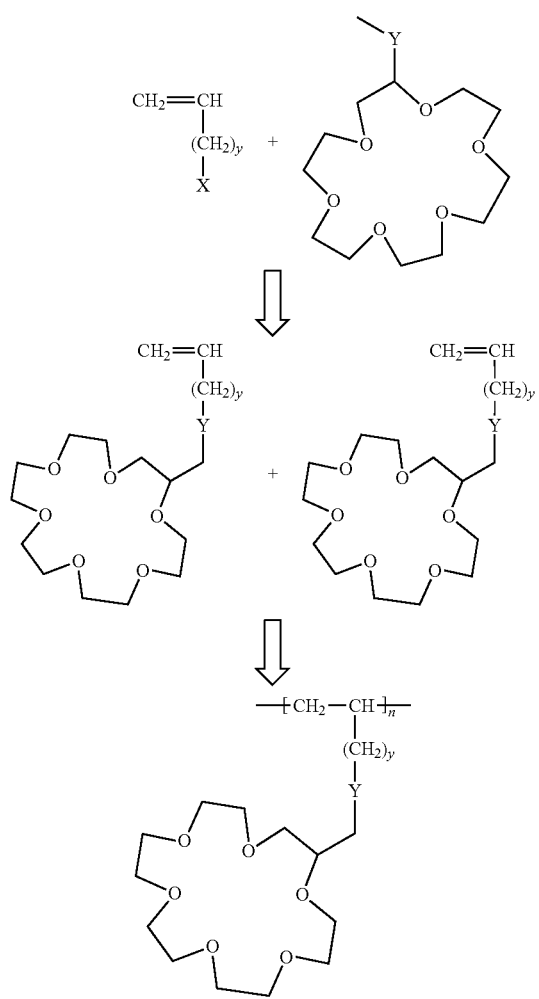

In a typical reaction, 6-bromo-1-hexene is allowed to react with a one molar ratio of hydroxymethyl-benzo-18-crown-6 in N,N-dimethylacetamide for 1 week at 50° C. under argon in a sealed vessel in the presence of excess potassium carbonate and a molecular equivalent of lutidine. The reaction mixture is filtered and the solvent and lutidine are then removed under vacuum and 1-hexyl-6-benzo-18-crown-6 is purified on silica gel by column chromatography eluting with tetrahydrofuran, methylene chloride, or ethyl acetate and hexanes. After removal of the solvent, the residue is dissolved in 10 wt. % toluene, 1 wt. % 1,6-hexadiene, and with 89 wt. % 1-butene bubbled into a glass beverage bottle with a rubber septum that is situated in an ice bath. The reactants in toluene are double-needle, dropwise transferred into another beverage bottle with a rubber septum under argon, situated in an ice bath, and containing a magnetic stir bar, toluene, $TiCl_3.AA$, 25 wt. % diethylaluminum chloride in toluene, and optionally a 1.1 molar solution of diethyl zinc, all of which are added to methanol using a Waring blender to fibrillate the precipitated crown ether substituted polyolefin as a fibrous pulp.

OTHER EXAMPLES

A more complete discussion of various techniques that can be used to graft crown ethers onto polymer backbones can be found in J. Smid, *Pure Appl. Chem.*, 48, 343 (1976), J. Smid, *Makrom. Chem. Supp.*, 5, 203 (1981), J. Smid, *Pure Appl. Chem.*, 54, 2129 (1982), and U. Tunca and Y. Yagci, "Crown Ether Containing Polymers," *Prog. Polym. Sci.*, 19, 233-286 (1994). Another method of making poly(olefins) with pendent crown ethers is to prepare poly(vinyl benzyl alcohol) containing polymers, as discussed in U.S. Pat. No. 6,200,716 to Fuller, and then react those polymers with chloromethyl-benzo-18-crown-6 in N,N-dimethylacetamide. Still another method involves preparing olefinic polymers with undecylenyl alcohol groups and allowing those polymers to react with lithium hydride in tetrahydrofuran in the presence of chloromethyl-benzo-18-crown-6.

EXAMPLE 3

The crown ether substituted polyolefins prepared by the method of either Example 1 or Example 2 may be added to a non-solvent such as methanol to form insoluble flocculated fibrous materials (flocs). The crown ether substituted polyolefins may, alternatively, be quenched with methanol, washed with water, and then stripped of toluene under reduced pressure. The polyolefins may then be fibrillated in a non-solvent such as water using a Waring blender. Next, the fibrillated polyolefins may be poured onto and laid down on a porous screen. The wet pulp polyolefin material may then be pressed to remove any residual non-solvent to form a fibrous mat, and subsequently hot pressed below the melting point of the polyolefin to form a fairly rigid crown ether substituted fibrous polyolefin material layer. The resultant polymer layer may then be utilized in a lithium ion battery as either a single layer microporous polymer separator or as part of a multilayer microporous polymer separator.

EXAMPLE 4

The crown ether substituted olefins (vinyl benzo-18-crown-6) prepared by the method described by J. Smid (see OTHER EXAMPLES above), or purchased from Aldrich of Milwaukee, Wis., may be dissolved in a toluene or benzene solution that optionally, but preferably, includes a cross-linking agent such as divinylbenzene with azobisisobutyronitrile (0.1 wt. % monomer mass). A commercial polyolefin lithium ion battery separator or a commercially available binder material may be dipped into the solution with subsequent heating under nitrogen between 60° C. and 80° C. so that polymerization of the crown ether substituted olefins can occur in the presence of the separator or polymer binder material. Commercial polyolefin battery separators, either single or multi-layered, are available from Asahi Kasei, headquartered in Tokyo, Japan, Celgard LLC, headquartered in Charlotte, N.C., Ube Industries, headquartered in Tokyo, Japan, and Mitsui Chemicals, headquartered in Tokyo, Japan, to name but a few manufacturers. The dissolved crown ether substituted polyolefins, at this point, become snagged in the polymer matrix of the commercial battery separator or the commercially available polymer binder material. Later, when the commercial battery separator or the commercially available polymer binder material is removed from the solution and air dried, the entrapped crown ether substituted polyolefins become insoluble polymer bound polyolefin particles. The presence of a cross-linker can enhance the entanglement of the crown ether substituted polyolefins contained in the commercial battery separator or the commercially available polymer binder material by promoting the formation of stronger polymer-polymer bonds between the polymer bound crown ether substituted polyolefins and between the polymer bound crown ether substituted polyolefins and the commercial battery separator/commercial polymer binder materials.

The above description of embodiments is merely exemplary in nature and, thus, variations thereof are not to be regarded as a departure from the spirit and scope of the invention.

What is claimed is:

1. A lithium ion battery, comprising:
   a positive electrode;
   a negative electrode;
   a microporous polymer separator soaked in an electrolyte solution, the microporous polymer separator disposed between the positive electrode and the negative electrode; and
   a chelating agent chemically attached to the microporous polymer separator, a binder material of the negative electrode, or a binder material of the positive electrode, and wherein the one or more chelating agents complex with transition metal cations but complex less strongly with lithium ions so that the movement of lithium ions between the negative and positive electrodes is not substantially affected;
   wherein the chelating agent is selected from the group consisting of a crown ether, a cryptand, a podand, a lariat ether, a calixarene, a calixcrown, or a mixture of two or more of these chelating agents.

2. The lithium ion battery as defined in claim 1 wherein the microporous polymer separator, the binder material of the negative electrode, or the binder material of the positive electrode is a polymer and wherein the crown ether attached to the polymer is a cyclic ether, and wherein oxygen atoms of the cyclic ether are to complex with the transition metal cations.

3. The lithium ion battery as defined in claim 1 wherein the chelating agent is selected from the group consisting of 15-crown-5, 15-crown-5 with at least one of its oxygen atoms exchanged for a nitrogen atom, 18-crown-6, and 18-crown-6 with at least one of its oxygen atoms exchanged for a nitrogen atom, and wherein the chelating agent includes one of 2-hydroxymethyl, hydroxymethyl-benzo, or 2-aminobenzo attached thereto.

4. The lithium ion battery as defined in claim 1 wherein the chelating agent is the cryptand and includes one of 2-hydroxymethyl, hydroxymethyl-benzo, or 2-aminobenzo attached thereto.

5. The lithium ion battery as defined in claim 1 wherein the chelating agent is selected from the group consisting of:

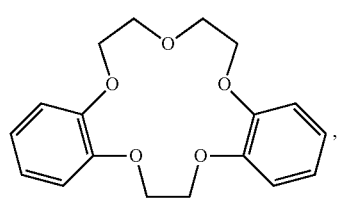

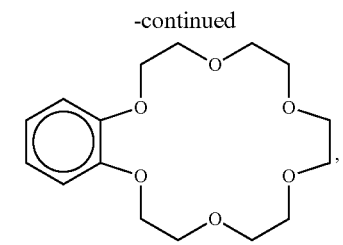

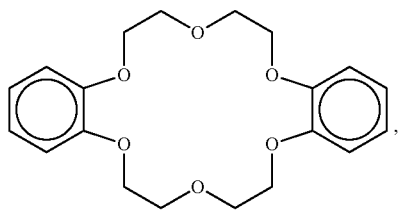

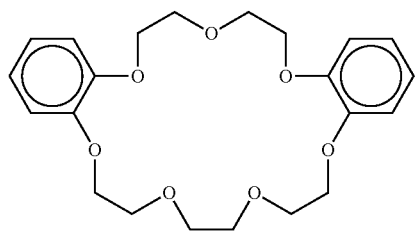

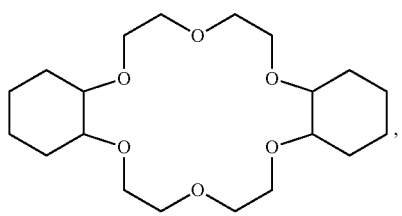

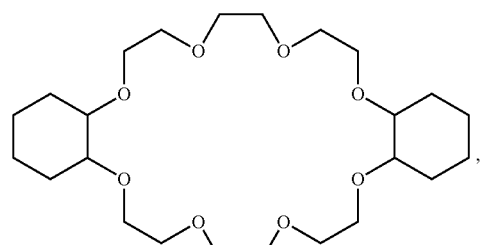

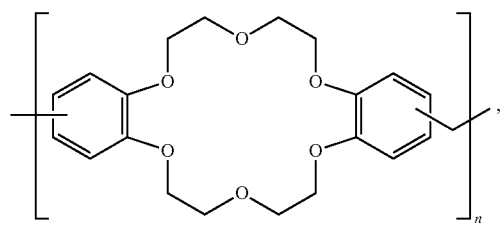

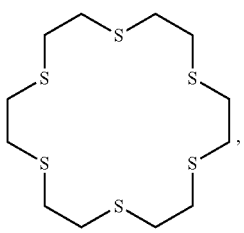

-continued

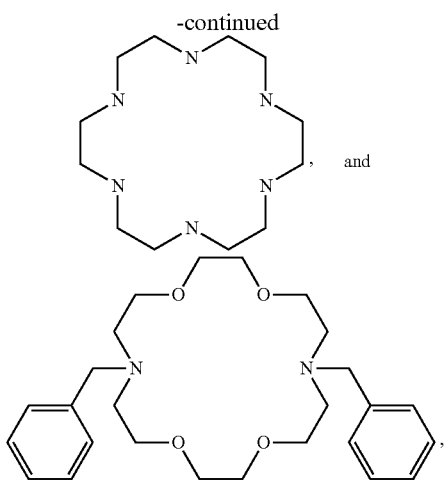

and wherein the chelating agent includes one of 2-hydroxymethyl, hydroxymethyl-benzo, or 2-aminobenzo attached thereto.

6. The lithium ion battery as defined in claim 1 wherein the chelating agent attached to the microporous polymer separator, the chelating agent attached to the binder material of the negative electrode, or the chelating agent attached to the binder material of the positive electrode is a crown ether substituted olefin that is cross-linked with a cross-linking agent of divinylbenzene with azobisisobutyronitrile.

7. The lithium ion battery as defined in claim 1 wherein the microporous polymer separator is a polyolefin with a formula:

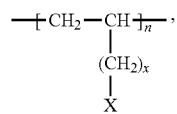

wherein n and x are integers, wherein X is I, Br, or Cl, and wherein the chelating agent includes a group that nucleophilically displaces X to attach the chelating agent to the polyolefin, the group being selected from the group consisting of 2-hydroxymethyl, hydroxymethyl-benzo, or 2-aminobenzo.

8. The lithium ion battery as defined in claim 1 wherein a polymer binder material of the negative electrode or a polymer binder material of the positive electrode include at least one of polyvinylidene fluoride, an ethylene polypropylene diene monomer rubber, or carboxymethyl cellulose.

9. A method, comprising:
forming a crown ether or a cryptand, the crown ether or the cryptand having one of an OH group or an NH group attached thereto; and
replacing a halide ion attached to a polymer with the crown ether or the cryptand, thereby forming a polymer material having a pendant crown ether or a pendant cryptand.

10. The method as defined in claim 9 wherein the OH group is selected from the group consisting of 2-hydroxymethyl and hydroxymethyl-benzo, or wherein the NH group is 2-aminobenzo.

11. The method as defined in claim 9 wherein the polymer is a polyolefin with a formula:

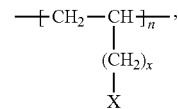

wherein n and x are integers, and wherein X is I, Br, or Cl.

12. The method as defined in claim 9 wherein the chelating agent is selected from the group consisting of 15-crown-5, 15-crown-5 with at least one of its oxygen atoms exchanged for a nitrogen atom, 18-crown-6, and 18-crown-6 with at least one of its oxygen atoms exchanged for a nitrogen atom, and wherein the OH group is selected from the group consisting of 2-hydroxymethyl and hydroxymethyl-benzo, or the NH group is 2-aminobenzo.

13. The method as defined in claim 9 wherein the cryptand includes one of 2-hydroxymethyl, hydroxymethyl-benzo, or 2-aminobenzo attached thereto.

14. The method as defined in claim 9 wherein the crown ether is selected from the group consisting of:

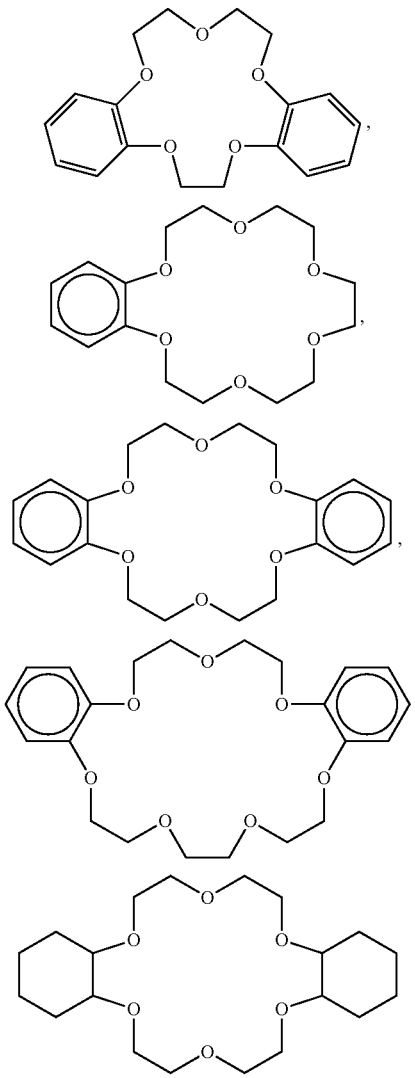

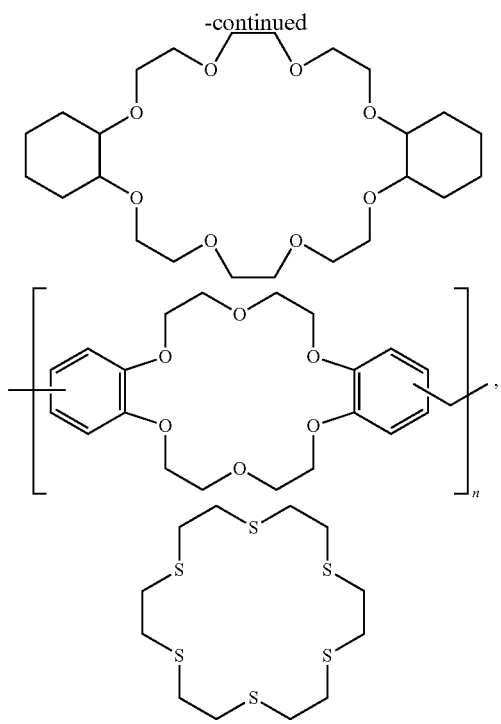
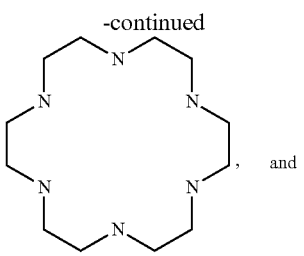
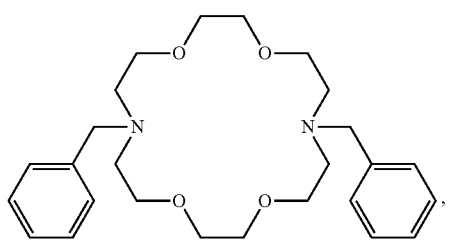
and wherein crown ether includes one of 2-hydroxymethyl, hydroxymethyl-benzo, or 2-aminobenzo attached thereto.
* * * * *